United States Patent [19]

Bergstrom et al.

[11] Patent Number: 5,006,932
[45] Date of Patent: Apr. 9, 1991

[54] APPARATUS FOR PROCESSING A VIDEO SIGNAL

[75] Inventors: Michael J. Bergstrom, Carshacton; Ajaib Hussain, Clapham, both of England

[73] Assignee: U.S. Philips Corporation, New York, N.Y.

[21] Appl. No.: 342,255

[22] Filed: Apr. 21, 1989

[30] Foreign Application Priority Data

Apr. 25, 1988 [GB] United Kingdom .............. 8809749

[51] Int. Cl.$^5$ .................... H04N 5/14; H04N 5/04; H04N 9/79
[52] U.S. Cl. ..................... 358/160; 358/20; 358/24; 358/153; 358/320; 358/322; 360/36.1
[58] Field of Search ............ 358/12, 19, 20, 21 R, 358/24, 148, 153, 160, 319, 320, 337, 322; 360/36.1

[56] References Cited

U.S. PATENT DOCUMENTS

3,005,869 10/1961 Dolby ................................ 358/165
4,716,461 12/1987 Hinn ................................. 358/165

FOREIGN PATENT DOCUMENTS

0119287 7/1983 Japan .

OTHER PUBLICATIONS

International Electrotechnical Commission, IEC Standard, "Pre-Recorded Optical Reflective Video-Disk System 'Laser Vision' 50 H$_2$/625 Lines-Pal"; UAR-25-16-596/8412; (1984).

Primary Examiner—John W. Shepperd
Assistant Examiner—Michael D. Parker
Attorney, Agent, or Firm—Michael E. Marion

[57] ABSTRACT

A composite video signal each line of which comprises a line synchronizing pulse, a front and a back porch and a vision portion, the synchronizing pulse of which may contain a burst of pulsed additional information is applied to an input terminal (1) which is connected to the input of a first signal path (T1, T2) whose output is connected to a current source (I1) and to an output terminal (8). A second signal path (T3, T4) has its input connected to a reference voltage input (5) and its output connected to the current source (I1) and the output terminal (8). A switching circuit (T5, T6) alternately enables the first and second signal paths (T1, T2; T3, T4) under the control of a switching signal at a connection (10) such that the output terminal (8) produces a composite video signal in which the synchronizing pulse at the input terminal is replaced by a pulse or level. The replacement does not contain the burst of pulsed additional information when present in the applied signal.

13 Claims, 2 Drawing Sheets

Fig.2

APPARATUS FOR PROCESSING A VIDEO SIGNAL

BACKGROUND OF THE INVENTION

The present invention relates to apparatus for processing a composite video signal substantially all the lines of which each comprise a line synchronising pulse, a front and a back porch and a vision portion, said apparatus comprising an input terminal for receiving said composite video signal, a first signal path having its input connected to said input terminal which first signal path includes first enabling means for enabling said first signal path outside the period of the synchronising pulse in each line period.

Such apparatus may be used in players for optically recorded video discs such as Laservision or CD Video (Compact Disc Video) where the synchronising pulses for PAL video signals contain a burst of pulsed additional information, called the video signal pilot burst, at a frequency of 3.75 MHz which is used for time base error correction. Apparatus of the type described in the opening paragraph is disclosed in Japanese Kokai No. 58-119287 which provides a vision signal path including an eliminating circuit which conveys the vision signal outside the line synchronising pulse periods, these synchronising pulses containing pilot burst. The nature of this pilot burst is given in the IEC standard UAR-2516-596/8412 Pre-recorded optical reflective video-disk system "Laservision" 50 Hz/625 lines - PAL, first edition 1984. Such a special burst is not required with NTSC video signals recorded on such discs as the relationship of the frequency of the colour burst to that of the line frequency (227.5 times) is such that the colour burst can be used for such time base error correction. However, this is not possible with PAL video signals recorded on such discs due to the offset in the colour burst-to-line frequency relationship and the change in phase of the burst from line to line. It is for this reason that the pilot burst is added to the PAL signal. As an alternative such apparatus may be used where a burst of pulsed additional information in the synchronising pulses contains audio (sound in syncs) or other information or where it is desired to replace the synchronising pulses with a reference level. In either case when processing the composite video signal the burst in the synchronising pulse can cause problems such as when trying to synchronise the video signal.

SUMMARY OF THE INVENTION

It an object of the invention to provide apparatus for processing such a composite video signal to achieve the required output.

The present invention provides apparatus for processing a composite video signal substantially all of the lines of which each comprise a line synchronising pulse, a front and a back porch and a vision portion, said apparatus comprising an input terminal for receiving said composite video signal, a first signal path having its input connected to said input terminal which first signal path includes first enabling means for enabling said first signal path outside the period of the synchronising pulse in each line period, characterised in that said apparatus further comprises a second signal path having its input connected to a source of reference voltage which second signal path includes second enabling means for enabling said second signal path during the period of the synchronising pulse in each line period, and means for connecting the outputs of said first and second signal paths to an output terminal for providing a composite video signal whose magnitude during the line synchronising pulse periods is determined by said reference voltage.

Such apparatus has the advantage that the synchronising pulse or its tip is removed from the input composite video signal and in the output video signal is replaced by a reference voltage level.

Where the synchronising pulses of the composite video signal contain a burst of pulsed additional information the invention may be further characterised in that the source of reference voltage provides a voltage of a level such that the magnitude of the voltage at the tips of the synchronising pulses in the output composite video signal corresponds to that in the input composite video signal and the line synchronising pulses do not contain the burst of pulsed additional information. This has the advantage that the level for the tips of the synchronising pulses at the output terminal is maintained.

Where it is desired to produce other outputs the invention may be characterised in that the apparatus additionally comprises a third signal path having its input connected to the input terminal, third enabling means for enabling said third signal path during the synchronising pulse periods, a fourth signal path having its input connected to the source of reference voltage, fourth enabling means for enabling the fourth signal path outside the synchronising pulse periods, and means for connecting the outputs of the third and fourth signal paths to a further output terminal for providing a signal which alternately comprises the bursts of additional information and a reference level. Thus with such an arrangement it is possible to derive the special burst or other information separately from the composite video signal.

A preferred embodiment may be characterised in that each signal path comprises an emitter follower transistor whose base is connected to the signal path input and whose emitter is connected through a unidirectional device to the signal path output, the enabling means comprising a switching circuit connected to the junction between the transistor and the unidirectional device for changing the voltage at the junction during the appropriate enabled periods. This has the advantage of providing a relatively simple construction for the signal paths.

For the first and second signal paths the switching circuit may comprise a first switching transistor whose collector is connected to the junction in the first signal path and a second switching transistor whose collector is connected to the junction in the second signal path, the emitters of the first and second switching transistors being commoned, the base of one of the switching transistors being connected to a point of reference potential while the base of the other switching transistor is connected to a switching signal such that the first switching transistor conducts outside the periods of the synchronising pulses to enable the transistor and the unidirectional device in the first signal path to convey the composite video signal from the input terminal to the output terminal outside the synchronising pulse periods while the second switching transistor conducts during the synchronising pulse periods to enable the transistor and the unidirectional device in the second signal path to convey the reference voltage or a voltage derived therefrom from the reference voltage source to the output terminal during the synchronising pulse periods. A similar switching circuit may be provided for the third and fourth signal paths.

BRIEF DESCRIPTION OF THE DRAWINGS

The above and other features of the invention will now be described, by way of example, with reference to the accompanying drawings, in which.

DETAILED DESCRIPTION OF THE INVENTION

Figure 1:
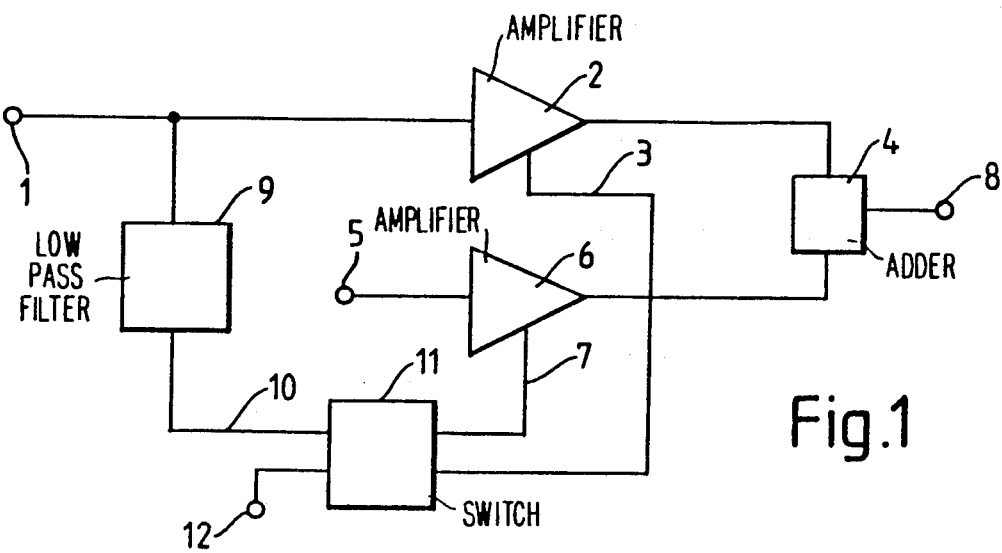
FIG. 1 is a block diagram of apparatus according to the invention.

In the block diagram of FIG. 1 an input terminal 1 is adapted to receive a PAL composite colour video signal which during a line period comprises sequentially a synchronising pulse, a front porch at black level which includes a burst at the colour sub-carrier frequency, a vision signal portion and a back porch also at the black level, and where each synchronising pulse may include a pilot burst as described above. The composite signal from input 1 is applied to a first signal path in the form of a gated amplifier 2 which may have unity gain, a gating signal being applied to the amplifier 2 via a connection 3 such that the amplifier 2 is enabled outside the synchronising pulse periods of the composite signal. The gated output from amplifier 2 is applied to a first input of an adder 4. A reference voltage level which corresponds to the voltage level of the tips of the synchronising pulses in the composite signal or to the black level or any level therebetween is applied by way of a reference level input 5 having a similar impedance to that of input 1 to a second signal path in the form of a gated amplifier 6 which may also have unity gain, a gating signal also being applied to the amplifier 6 via a connection 7 such that the amplifier 6 is enabled only during the synchronising pulse periods. The gated output from amplifier 6 is applied to a second input of the adder 4 whose output is connected to an output terminal 8.

The composite signal at input terminal 1 is also applied to a low pass filter 9 which removes much of the high frequency components from the composite signal so that amongst others, most if not all of the pilot burst, when present, is removed from each line synchronising pulse. The resulting filtered composite signal is applied over a connection 10 to a switch 11 an input 12 of which receives a voltage reference which preferably corresponds to the half amplitude level of the line synchronising pulses in the filtered composite signal on connection 10. Switch 11 operates such that in the presence of each line synchronising pulse on connection 10 a gating signal is applied to connection 7 while during the remaining periods of the composite signal a gating signal is applied to connection 3.

With the arrangement of FIG. 1 the front and back porches and the vision portion from the composite video signal are present at the first input of adder 4 during each line period. To this is added, during each synchronising pulse period, a level present at the second input of adder 4 from reference level input 5 which, as previously described, may be the voltage level of the tip of the synchronising pulses or other suitable level. Thus at the output terminal 8 a composite video signal is reproduced which does not contain the pilot burst, or other signal including the received synchronising pulse, during the line synchronising pulse periods.

In a modification of the arrangement shown in FIG. 1 the control signal on connection 10 may be obtained in a manner different to that shown, e.g. from sandcastle pulses present in a televison receiver. In addition the synchronising pulses themselves can be extracted complete with the special burst for further processing.

Figure 2:
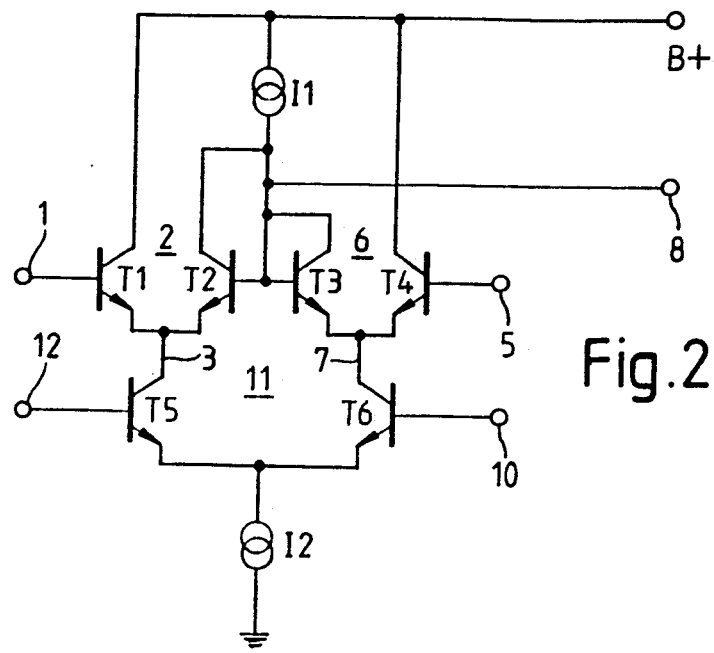
FIG. 2 is a diagram of a first embodiment of a circuit for the apparatus of FIG. 1.

The circuit arrangement diagram of FIG. 2 is a first embodiment of the arrangement of FIG. 1 and corresponding reference symbols between the two figures indicate like components. The input terminal 1 is applied to the first signal path whose input is connected to the base of a npn transistor T1 whose emitter is connected to the emitter of a diode-connected npn transistor T2 and which together form the unity gain amplifier 2. The collector of transistor T1 is directly connected to the positive rail B+ of a voltage supply source whose negative rail is connected to earth while the collector and base of transistor T2, which forms the output of the first signal path, is connected to supply rail B+ via a current source I1. Transistor T2 collector/base is also connected to the output terminal 8 and to the collector and base of a further diode-connected npn transistor T3 whose collector/base forms the output of the second signal path and whose emitter is connected to that of yet a further npn transistor T4 the collector of which is connected directly to the supply rail B+. The base of transistor T4 forms the input of the second signal path which is connected to reference level input 5, transistors T3 and T4 forming the unity gain amplifier 6. The emitters of transistors T1, T2 are connected to the collector of an npn transistor T5 forming the connection 3 whose emitter is connected to that of a further npn transistor T6 the collector of which forms the connection 7 and is connected to the emitters of transistors T3, T4. The emitters of transistors T5, T6 are connected to the earth rail through a second current source I2. The base of transistor T6 is connected to the connection 10 while the base of transistor T5 is connected to the input 12 providing the voltage reference of half the amplitude of the line synchronising pulses.

In operation transistors T5, T6 form the switch 11 with either transistor T6 conducting during each synchronising pulse period when connection 10 is above the voltage reference at input 12 or transistor T5 conducts during the portions of a line period outside the line synchronising pulse period when the connection 10 is below the voltage at input 12. During the periods when transistor T5 conducts the first signal path is enabled with transistors T1 and T2 also conducting and the porch and vision portions of the composite signal at input terminal 1 are conveyed to the output terminal 8. At these times transistors T3 and T4 are non-conducting, this situation being changed when transistor T6 conducts thus enabling the second signal path when the voltage level at input 5 is conveyed to the output terminal 8 independent of the composite video signal at the input terminal 1. Thus the output at the output terminal 8 comprises the porch and vision portions of the composite signal present at input terminal 1 and a level determined by the voltage level at input 5 which can form a replacement synchronising pulse.

FIG. 3 is a diagram of a modified embodiment of the circuit of FIG. 2 and corresponding reference symbols used in FIGS. 1, 2 and 3 again indicate like components.

Figure 3:
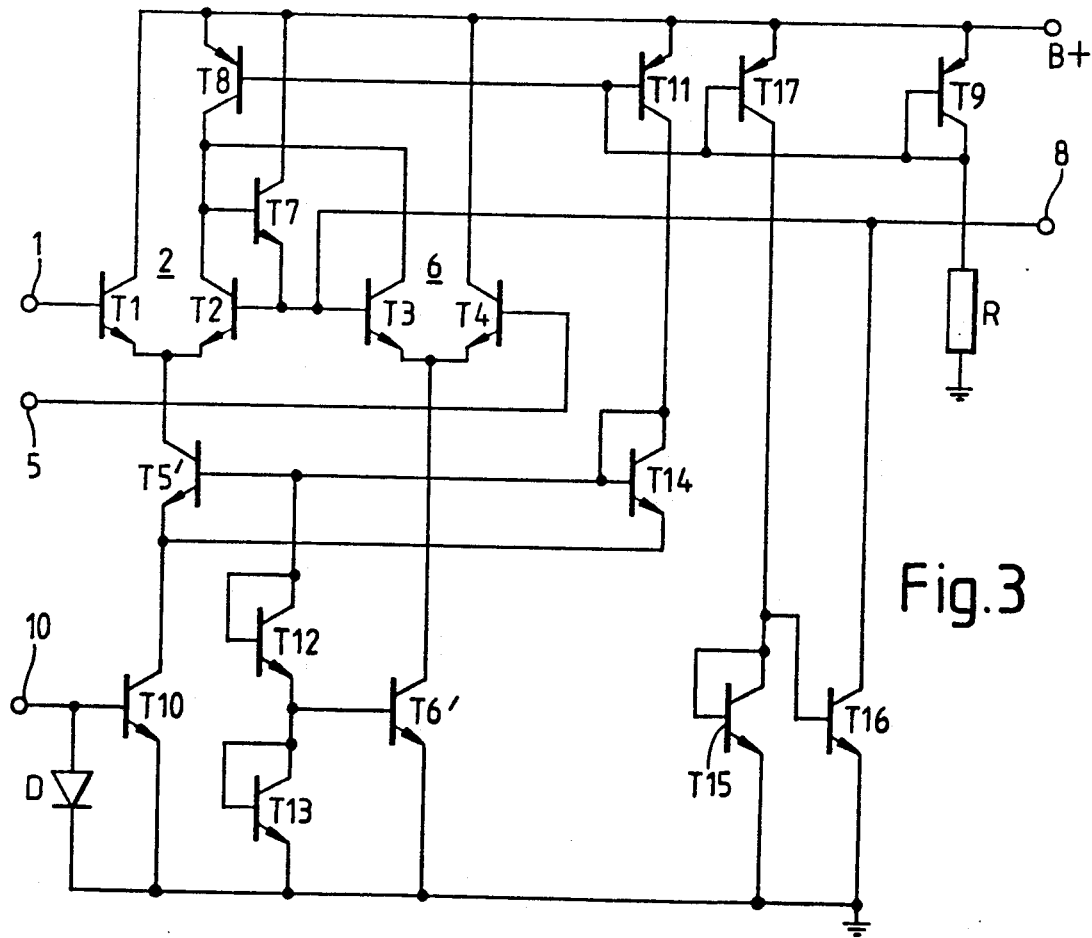
FIG. 3 is a diagram of a second embodiment of a circuiit for the apparatus of FIG. 1.

The circuit of FIG. 3 may be used where headroom is a problem, i.e. the applied signal amplitude is significant compared with the supply voltage B+. The input terminal 1 is again connected to the first signal path comprising transistors T1, T2 while the voltage level on input 5 is applied to the second signal path comprising transistors T3, T4. The collector of transitor T2 is coupled through emitter follower npn transistor T7 acting as a buffer amplifier obviating the need for such a buffer amplifier beyond output terminal 8 and in addition provides feedback between the collectors and bases of transistor T2 and T3. Current source I2 is provided by pnp transistor T8 and diode connected pnp transistor T9 connected in the manner shown, the collector of transistor T9 being connected through a resistor R to earth. Switching transistor T5 of FIG. 2 is replaced by transistor T5' the emitter of which is connected to the collector of an npn transistor T10 whose base is connected to the connection 10 and to earth through a diode D poled in the manner shown while its emitter is connected to earth to clamp the base of transistor T10 at 0.7 v and so prevent over saturation of this transistor. The base of transistor T5' is connected to a junction on a potential divider comprising a pnp current source transistor T11 whose emitter is connected to the supply rail B+ and whose base is connected to that of diode connected transistor T9, and two diode-connected npn transistors T12 and T13, the lower end of the potential divider being connected to earth. In addition a diode-connected npn transistor T14 is connected in parallel with the base-emitter junction of transistor T5'. Switching transistor T6 of FIG. 2 is replaced by transistor T6' whose emitter is connected to earth and whose base is connected to the junction between transistors T12 and T13 in the potential divider. Finally a current source comprising a diode-connected npn transistor T15, whose emitter is connected to earth, and a further npn transistor T16, whose emitter is also connected to earth and whose base is connected to the base/collector of transistor T15 and to the collector of a pnp transistor T17 whose emitter is connected to the supply rail B+ and whose base is connected to that of transistor T9, is connected to the output terminal 8 by way of the collector of transistor T16. This latter current source provides a current sinking capability at output 8.

In operation, let it initially be considered that the signal at connection 10 is above earth potential and that during each line synchronising pulse period is at or below the cut-off voltage for transistor T10. This transistor will then be non-conducting as will be transistor T5' with the result that transistor pair T1, T2 cannot convey the synchronising pulses plus special burst from the input terminal 1 to the output terminal 8. At this time the voltage at the base of transistor T5' will be at the sum of the $V_{be}$ voltages for transistors T12 and T13, i.e. 2 $V_{be}$, while the voltage at its emitter will be Vbe due to the drop of $V_{be}$ across transistor T14. Transistor T6' will conduct due to the voltage at the junction of transistors T12 and T13 present at its base resulting in transistor pair T3, T4 conducting and the voltage level at input 5 being conveyed to output terminal 8. At the end of each synchronising period the signal at the connection 10 becomes sufficiently positive that transistor T10 and hence T5' conduct resulting in transistor pair T1, T2 conducting to allow the porch and vision periods to be conveyed to output terminal 8. When transistor T5' conducts the voltage levels at its base and emitter fall below 2 Vbe and Vbe respectively thus causing transistors T12, T13 in the potential divider to stop conducting which in turn will cause transistor T6' and transistor pair T3, T4 to be simultanously non-conducting until the next enabling synchronising pulse appears at the connection 10.

Figure 4:
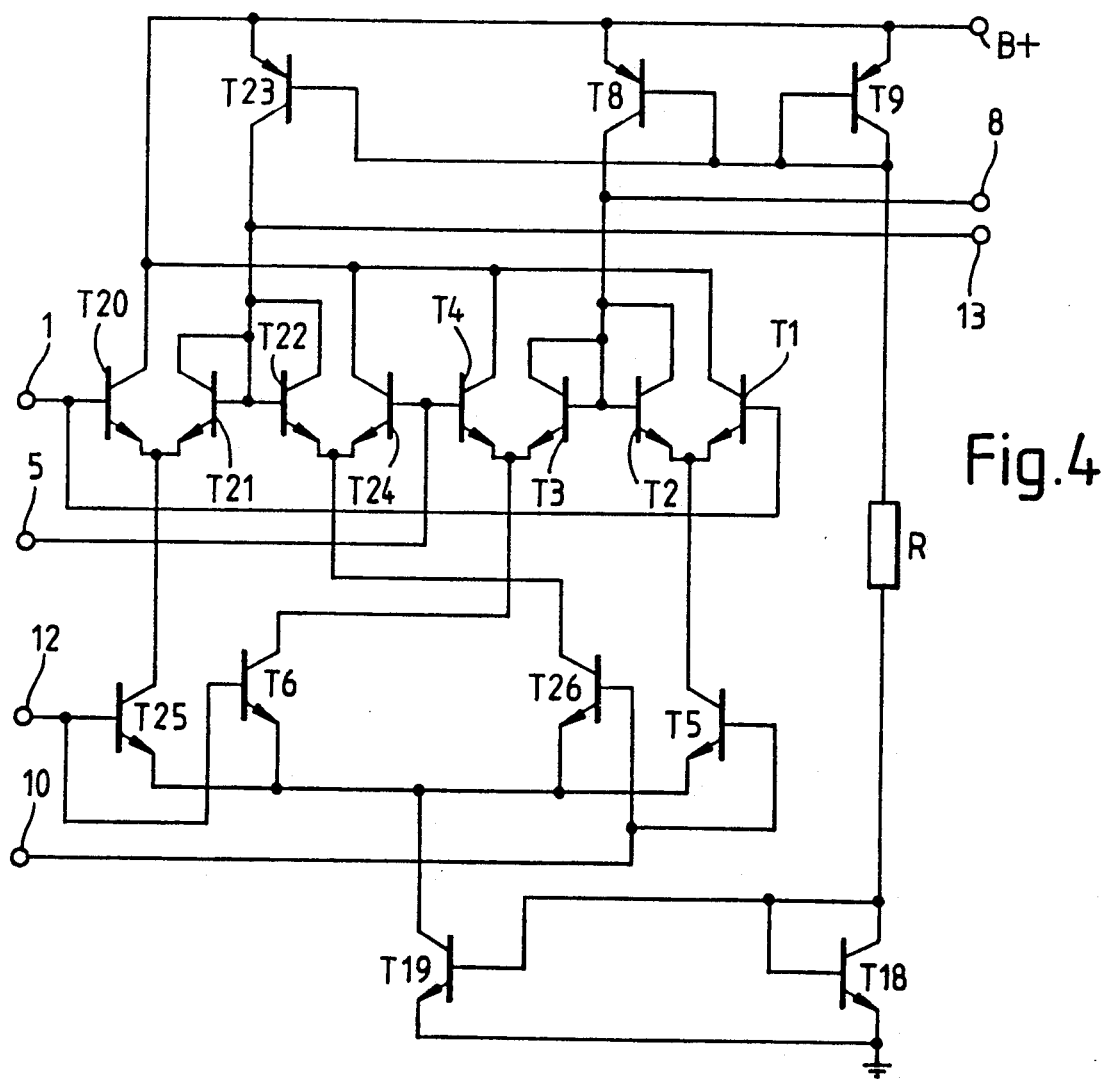
FIG. 4 is a modification of the circuit of FIG. 2.

FIG. 4 is a diagram of the embodiment of the circuit of FIG. 2 with some additional circuitry and again corresponding reference symbols with the previous figures, including FIG. 3, indicate like components. In FIG. 4 the transistors T1 to T6, T8 and T9 operate in the same manner as with FIG. 2 save that the connection 10 is now inverted and applied to transistor T5 while the voltage reference input 12 is applied to transistor T6. The lower end of resistor R is connected to a diode-connected npn transistor T18 whose emitter is connected to earth and whose collector/base is additionally connected to the base of a further npn transistor T19 which forms the current source I2. The composite video signal at input terminal 1 is additionally applied to a third signal path whose input is connected to the base of a further npn transistor T20 whose emitter is connected to that of a diode-connected npn transistor T21 and whose collector is connected to the supply rail B+. The collector and base of transistor T21 and the collector and base of a further diode-connected npn transistor T22 which form the outputs of the third and a fourth signal path are connected to the collector of a current source pnp transistor T23 whose collector and base are respectively connected to the supply rail B+ and the base/collector of transistor T9. The emitter of transistor T22 is connected to that of a further npn transistor T24 and which together form the fourth signal path, the collector of transistor T24 being connected to the supply rail B+ while its base, which forms the input to the fourth signal path, is connected to the input 5. The emitters of transistor pair T20, T21 are connected to the collector of a further switching npn transistor T25 whose base is connected to the voltage reference input 12 and whose emitter is connected to transistor T19 collector. In a similar manner the emitters of transistor pair T22, T24 are connected to the collector of yet a further switching npn transistor T26 whose base is connected to the connection 10 and whose emitter is also connected to transistor T19 collector. A further output terminal 13 is connected to the base/collector of transistors T21 and T22 and the operation is such that during the line synchronising pulse periods transistor T25 conducts to allow the line synchronising pulses and the special burst, when present, to be passed from input 1 via the third signal path (transistor pair T20, T21) to the terminal 13 while during the porch and vision periods transistor T26 conducts to allow the voltage level at input 5 to pass via the fourth signal path (transistor pair T22, T24) to the output terminal 13. If this voltage level is at the voltage level of the tips of the synchronising pulses then the output at terminal 13 will be the pilot burst about this level.

From reading the present disclosure, other modifications will be apparent to persons skilled in the art. Such modifications may involve other features which are already known in the design, manufacture and use of apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. An apparatus for processing a composite video signal substantially all of the lines of which each comprise a line synchronising pulse, a front and a back porch and a vision portion, said apparatus comprising:

(a) a first input terminal for receiving said composite video signal and a second input terminal for receiving a reference voltage;

(b) a first signal path comprising a first transistor whose base is connected to said first input terminal and whose emitter is connected through a first unidirectional device to a first signal path output, and first enabling means for enabling said first signal path outside the period of the synchronising pulse in each line period, said first enabling means comprising a first switching circuit connected to the junction between said first transistor and said first unidirectional device;

(c) a second signal path comprising a second transistor whose base is connected to said second input terminal and whose emitter is connected through a second unidirectional device to a second signal path output, and second enabling means for enabling said second signal path during the period of the synchronising pulse in each line period, said second enabling means comprising a second switching circuit connected to the junction between said second transistor and said second unidirectional device; and (d) means for connecting said first and second signal path outputs to an output terminal for providing a composite video signal whose magnitude during the line synchronising pulse periods is determined by said reference voltage.

2. An apparatus as claimed in claim 1 for processing a composite video signal whose synchronising pulses contain a burst of pulsed additional information, wherein said reference voltage provides a voltage of a level such that the magnitude of the voltage present at the tips of the synchronising pulses in the output composite video signal corresponds to the magnitude of the voltage present at the tips of the synchronising pulses in the input composite video signal.

3. An apparatus as claimed in claim 2, further comprising a third signal path having its input connected to said first input terminal, third enabling means for enabling said third signal path during the synchronising pulse periods, a fourth signal path having its input connected to said reference voltage, fourth enabling means for enabling said fourth signal path outside the synchronising pulse periods, and means for connecting the outputs of said third and fourth signal paths to a second output terminal for providing a signal which alternately comprises said bursts of additional information and a reference level.

4. An apparatus as claimed in claim 3, wherein (a) said third signal path comprises a third transistor whose base is connected to said first input terminal and whose emitter is connected through a third unidirectional device to said third signal path output and said third enabling means comprises a third switching circuit connected to the junction between said third transistor and said third unidirectional device; and (b) said fourth signal path comprises a fourth transistor whose base is connected to said second input terminal and whose emitter is connected through a fourth unidirectional device to said fourth signal path output and said fourth enabling means comprises a fourth switching circuit connected to the junction between said fourth transistor and said fourth unidirectional device.

5. An apparatus as claimed in claim 3, wherein said third enabling means comprises a third switching circuit coupled to a third transistor and said third unidirectional device and said fourth enabling means comprises a fourth switching circuit coupled to a fourth transistor and a fourth unidirectional device.

6. An apparatus as claimed in claim 1, wherein said first and second switching circuits comprise first and second switching transistors respectively, said first switching transistor having its collector connected to the junction between said first transistor and said first unidirectional device and said second switching transistor having its collector connected to the junction between said second transistor and said second unidirectional device, the emitters of said first and second switching transistors being commoned, the base of said first switching transistor being connected to a point of reference potential, the base of said second switching transistor being connected to a switching signal such that said first switching transistor conducts outside the periods of the synchronising pulses to enable said first transistor and said first unidirectional device to convey said composite video signal from said first input terminal to the output terminal outside said synchronising pulse periods, and said second switching transistor conducts during the synchronising pulse periods to enable said second transistor and said second unidirectional device to convey said reference voltage or a voltage derived therefrom to the output terminal during said synchronising pulse periods.

7. An apparatus as claimed in claim 6 wherein said switching signal is derived from the composite video signal at said input terminal.

8. An apparatus as claimed in claim 7, wherein the composite video signal at the said input terminal is applied to the base of said second switching transistor via a low pass filter.

9. An apparatus as claimed in claim 6 further comprising a third signal path having its input connected to said first input terminal, third enabling means for enabling said third signal path during the synchronising pulse periods, a fourth signal path having its input connected to said reference voltage, fourth enabling means for enabling said fourth signal path outside the synchronising pulse periods, and means for connecting the outputs of said third and fourth signal paths to a second output terminal for providing a signal which alternately comprises said bursts of additional information and a reference level.

10. An apparatus as claimed in claim 9, wherein said third enabling means comprises a third switching circuit coupled to a third transistor and a third unidirectional device and said fourth enabling means comprises a fourth switching circuit coupled to a fourth transistor and a fourth unidirectional device.

11. An apparatus as claimed in claim 10, wherein said third switching circuit comprises a third switching transistor whose collector is connected to the junction between said third transistor and said third unidirectional device and said fourth switching circuit comprises a fourth switching transistor whose collector is connected to the junction between said fourth transistor and said fourth unidirectional device, the emitters of said third and fourth switching transistors being commoned with the emitters of said first and second switching transistors, the base of said third switching transistor being connected to the base of said second switching transistor, the base of said fourth switching transistor being connected to the base of said first switching transistor such that said third switching transistor conducts coincidentally with said second switching transistor to enable said third transistor and said third unidirectional device to convey the line synchronising pulses and contained bursts of pulsed additional information from said first input terminal to said second output terminal during the line synchronising pulse periods, while said fourth switching transistor conducts coincidentally with said first switching transistor to enable said fourth transistor and said fourth unidirectional device to convey said reference voltage or a voltage derived therefrom to said second output terminal outside the said synchronising pulse periods.

12. Apparatus as claimed in claim 11 wherein said switching signal is derived from the composite video signal at said first input terminal.

13. An apparatus as claimed in claim 12, wherein the composite video signal at said first input terminal is applied to the base of said second switching transistor via a low pass filter.

* * * * *